(12) United States Patent
Tanaka et al.

(10) Patent No.: US 10,315,157 B2
(45) Date of Patent: Jun. 11, 2019

(54) SYSTEM AND METHOD FOR SEPARATING CARBON DIOXIDE FROM NATURAL GAS

(71) Applicant: MITSUBISHI HEAVY INDUSTRIES, LTD., Tokyo (JP)

(72) Inventors: Yukio Tanaka, Tokyo (JP); Tomoh Akiyama, Tokyo (JP); Ryuji Yoshiyama, Tokyo (JP); Masayuki Eda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 96 days.

(21) Appl. No.: 15/553,293

(22) PCT Filed: Nov. 16, 2015

(86) PCT No.: PCT/JP2015/082071
§ 371 (c)(1),
(2) Date: Aug. 24, 2017

(87) PCT Pub. No.: WO2016/136046
PCT Pub. Date: Sep. 1, 2016

(65) Prior Publication Data
US 2018/0028965 A1 Feb. 1, 2018

(30) Foreign Application Priority Data

Feb. 26, 2015 (JP) ................. 2015-036710

(51) Int. Cl.
*B01D 53/22* (2006.01)
*B01D 53/04* (2006.01)
(Continued)

(52) U.S. Cl.
CPC .......... *B01D 53/229* (2013.01); *B01D 53/04* (2013.01); *B01D 53/265* (2013.01); *C10L 3/103* (2013.01);
(Continued)

(58) Field of Classification Search
None
See application file for complete search history.

(56) References Cited

U.S. PATENT DOCUMENTS 9,051,228 B2 * 6/2015 Mitariten ................ C07C 7/005
9,943,802 B1 * 4/2018 Ballaguet ............... B01D 53/22
(Continued)

FOREIGN PATENT DOCUMENTS

JP 2005-296817 10/2005
JP 2006-507385 3/2006
(Continued)

OTHER PUBLICATIONS

International Search Report dated Dec. 28, 2015 in International (PCT) Application No. PCT/JP2015/082071.

*Primary Examiner* — Tam M Nguyen
(74) *Attorney, Agent, or Firm* — Wenderoth, Lind & Ponack, L.L.P.

(57) ABSTRACT

A system and method for separating $CO_2$ from natural gas, which ensure that no clogging or deterioration occurs in a gas separation membrane even after the gas separation membrane is used to remove carbon dioxide from the natural gas under conditions in which the natural gas is pressurized. First, an $H_2S$ remover removes hydrogen sulfide from raw natural gas. Then, a compressor pressurizes the natural gas from which $H_2S$ has been removed. After that, a cooler cools the pressurized natural gas so as to condense components that are a part of the natural gas. A gas/liquid separator removes the condensed components, and a $CO_2$ separator, including a separation membrane for separating $CO_2$ removes $CO_2$ from the natural gas from which the condensed components have been removed. An expander, which shares a drive shaft with the compressor, expands the natural gas from which $CO_2$ has been removed and recovers energy therefrom.

4 Claims, 4 Drawing Sheets

(51) Int. Cl.
  *B01D 53/26* (2006.01)
  *C10L 3/10* (2006.01)
  *B01D 71/02* (2006.01)

(52) U.S. Cl.
  CPC .............. *C10L 3/104* (2013.01); *B01D 53/26* (2013.01); *B01D 71/021* (2013.01); *B01D 71/028* (2013.01); *B01D 2253/106* (2013.01); *B01D 2253/108* (2013.01); *B01D 2253/116* (2013.01); *B01D 2256/24* (2013.01); *B01D 2256/245* (2013.01); *B01D 2257/304* (2013.01); *B01D 2257/504* (2013.01); *B01D 2257/80* (2013.01); *C10L 2290/06* (2013.01); *C10L 2290/46* (2013.01); *C10L 2290/48* (2013.01); *C10L 2290/54* (2013.01); *C10L 2290/548* (2013.01); *Y02C 10/08* (2013.01); *Y02C 10/10* (2013.01); *Y02C 10/12* (2013.01)

(56) References Cited

U.S. PATENT DOCUMENTS

| | | |
|---|---|---|
| 2004/0099138 A1 | 5/2004 | Karode et al. |
| 2006/0177364 A1 | 8/2006 | Ogura et al. |
| 2006/0191410 A1* | 8/2006 | Dolan .................. B01D 53/047 95/96 |
| 2006/0266214 A1* | 11/2006 | Won .................. B01D 53/1425 95/234 |
| 2008/0011161 A1 | 1/2008 | Finkenrath et al. |
| 2008/0127632 A1 | 6/2008 | Finkenrath et al. |
| 2011/0142722 A1* | 6/2011 | Hemmings .......... B01D 53/228 422/149 |
| 2013/0098242 A1 | 4/2013 | Ungerank et al. |
| 2015/0292403 A1* | 10/2015 | Denton .................... F02C 3/20 60/772 |
| 2017/0122659 A1* | 5/2017 | Gnanendran ...... B01D 53/1456 |
| 2017/0328632 A1* | 11/2017 | Prim ...................... F25J 3/0204 |
| 2018/0112142 A1* | 4/2018 | Foody ................. B01D 53/047 |
| 2018/0265795 A1* | 9/2018 | Lourenco .................. C10L 3/10 |
| 2019/0054415 A1* | 2/2019 | Maher ............... B01D 53/1462 |
| 2019/0054416 A1* | 2/2019 | Maher ............... B01D 53/1462 |

FOREIGN PATENT DOCUMENTS

| | | |
|---|---|---|
| JP | 2009-113994 | 5/2009 |
| JP | 2013-534863 | 9/2013 |
| WO | 2013/086194 | 6/2013 |

\* cited by examiner

SYSTEM AND METHOD FOR SEPARATING CARBON DIOXIDE FROM NATURAL GAS

TECHNICAL FIELD

The present invention relates to a system and method for separating carbon dioxide ($CO_2$) from natural gas.

BACKGROUND ART

Natural gas produced from gas fields or oil fields includes many impurities such as $CO_2$. After such impurities such as $CO_2$ have been removed from the natural gas, the resultant gas is shipped as product gas. In a known $CO_2$ removal method, $CO_2$ is absorbed and removed from the natural gas by use of an amine absorbing liquid as disclosed, for example, in JP 2005-296817 A. This method requires regeneration of the absorbing liquid that has absorbed much $CO_2$ by heating the absorbing liquid to release $CO_2$. Thus, when used, in particular, in processing natural gas with a high concentration of $CO_2$, the method requires a large amount of energy and thus incurs huge operating costs, which is problematic.

In another known $CO_2$ removal method, $CO_2$ is removed using a gas separation membrane with high $CO_2$ selectivity. In this connection, JP 2009-113994 A discloses a related method, although its subject gas is exhaust gas from a power plant. In the method, the exhaust gas is pressurized by a compressor of a gas turbine, and $CO_2$ is then removed therefrom by use of a gas separation membrane. Such a method using a gas separation membrane is superior to the amine absorption method in terms of operating cost.

CITATION LIST

Patent Literatures

[Patent Literature 1] JP 2005-296817 A
[Patent Literature 2] JP 2009-113994 A

SUMMARY OF INVENTION

Technical Problems

There has been developed a gas separation membrane having a high gas permeability rate and an excellent $CO_2$ selectivity against methane ($CH_4$), which is a main component of natural gas. However, such a high-performance gas separation membrane is very expensive. In this connection, the present inventors have found that compressing and pressurizing natural gas supplied to the gas separation membrane increases the $CO_2$ partial pressure difference across the gas separation membrane, thus making it possible to reduce the area of the gas separation membrane required for a predetermined gas permeation rate, and thereby to reduce the equipment cost for the gas separation membrane. However, the present inventors have also found that pressurizing natural gas when removing $CO_2$ therefrom by use of a gas separation membrane causes the clogging and deterioration of the gas separation membrane, which is problematic.

In view of the above problems, an object of the present invention is to provide a system and method for separating carbon dioxide from natural gas, which ensure that no clogging or deterioration occurs in a gas separation membrane even after the gas separation membrane is used to remove $CO_2$ from the natural gas under the conditions in which the natural gas is pressurized.

Solution to Problems

An aspect of the present invention is a system for separating carbon dioxide from natural gas containing carbon dioxide and hydrogen sulfide, comprising: a hydrogen sulfide remover for removing hydrogen sulfide from the natural gas; a compressor for pressurizing the natural gas from which hydrogen sulfide has been removed by the hydrogen sulfide remover; a cooler for cooling the natural gas that has been pressurized by the compressor so as to condense a component that is a part of the natural gas; a gas/liquid separator for removing the condensed component from the natural gas that has been cooled by the cooler; a carbon dioxide separator including a separation membrane for separating carbon dioxide from the natural gas from which the condensed component has been removed by the gas/liquid separator; and an expander for expanding the natural gas from which carbon dioxide has been separated by the carbon dioxide separator and recovering energy from the natural gas.

As used herein, examples of raw natural gas broadly include not only natural gas produced from gas fields, but also unconventional natural gases such as associated gas produced with petroleum from oil fields and shale gas. In addition to methane, which is a main component of product natural gas, the raw natural gas includes hydrocarbons with two or more carbon atoms, and also includes carbon dioxide and hydrogen sulfide as impurities.

The cooler may be a heat exchanger for exchanging heat between the natural gas that has been pressurized by the compressor and the natural gas that has been expanded by the expander.

The system according to the present invention may further comprise: a second compressor for pressurizing carbon dioxide-containing gas that has been separated by the carbon dioxide separator; a second heat exchanger for cooling and liquefying the carbon dioxide-containing gas that has been pressurized by the second compressor; a second gas/liquid separator for separating off-gas from the liquefied gas; and a line for supplying the natural gas that has been expanded by the expander as cold energy source to the second heat exchanger.

The system according to the present invention may further comprises: a third heat exchanger for cooling the natural gas from which carbon dioxide has been separated by the carbon dioxide separator so as to liquefy a component that is a part of the natural gas; a third gas/liquid separator for separating the liquefied component from the natural gas that has been cooled by the third cooler; a line for supplying the natural gas from which the liquefied component has been separated by the third gas/liquid separator to the expander; and a line for supplying the natural gas that has been expanded by the expander as cold energy source to the third heat exchanger.

Another aspect of the present invention is a method for separating carbon dioxide from natural gas containing carbon dioxide and hydrogen sulfide, comprising: a step of removing hydrogen sulfide from the natural gas; a step of compressing and pressurizing the natural gas from which hydrogen sulfide has been removed; a step of cooling the pressurized natural gas so as to condense a component that is a part of the natural gas; a step of removing the condensed component from the cooled natural gas; a step of separating, by use of a separation membrane, carbon dioxide from the natural gas from which the condensed component has been removed; and a step of expanding the natural gas from which carbon dioxide has been removed and recovering an energy from the natural gas.

The step of cooling the pressurized natural gas may be performed by exchanging heat between the pressurized natural gas and the expanded natural gas.

The method according to the present invention may further comprises: a step of pressurizing carbon dioxide-containing gas that has been separated by use of the separation membrane; a second cooling step of cooling and liquefying the pressurized carbon dioxide-containing gas; and a second gas/liquid separating step of separating off-gas from the liquefied gas. The second cooling step of cooling the carbon dioxide-containing gas may be performed by exchanging heat between the carbon dioxide-containing gas and the expanded natural gas.

The system according to the present invention may further comprises: a third cooling step of cooling the natural gas from which carbon dioxide has been separated by use of the separation membrane so as to liquefy a component that is a part of the natural gas; and a third gas/liquid separating step of separating the liquefied component from the natural gas that has been cooled in the third cooling step. The step of expanding the natural gas may be expanding the natural gas from which the liquefied component has been separated in the third gas/liquid separating step. The third cooling step may be performed by exchanging heat between the natural gas from which carbon dioxide has been separated and the expanded natural gas.

Advantageous Effects of Invention

The present inventors have found that, when a gas separation membrane is used to separate $CO_2$ from natural gas, $H_2S$ and water contained in the natural gas are adsorbed on the separation membrane, thus deteriorating the performance of the separation membrane. Further, since the gas separation membrane removes a significant concentration of $CO_2$ from the natural gas supplied to the gas separation membrane, the partial pressures of components other than $CO_2$ contained in the natural gas rise at the separation membrane. The present inventors et al. have found the following regarding, among these components, water and hydrocarbons with two or more carbon atoms (referred also to as natural gas liquids or NGL) each having a higher boiling point than methane, a main component of natural gas. At the separation membrane, partial pressures of water and hydrocarbons with two or more carbon atoms rise above their vapor pressures, so that water and hydrocarbons with two or more carbon atoms are condensed or deposited on a separation membrane surface, thus causing the clogging of the separation membrane. According to the present invention, $H_2S$ is removed from raw natural gas before it is pressurized, and water and high-boiling components are removed from the natural gas after it is pressurized. This reduces or prevents adsorption of $H_2S$ and water as well as condensation or deposition of high-boiling components on the separation membrane, thus allowing prevention of the clogging or performance deterioration of the separation membrane.

DESCRIPTION OF EMBODIMENTS

With reference to the accompanying drawings, embodiments of a system and method for separating $CO_2$ from natural gas according to the present invention will be described below.

Figure 1:
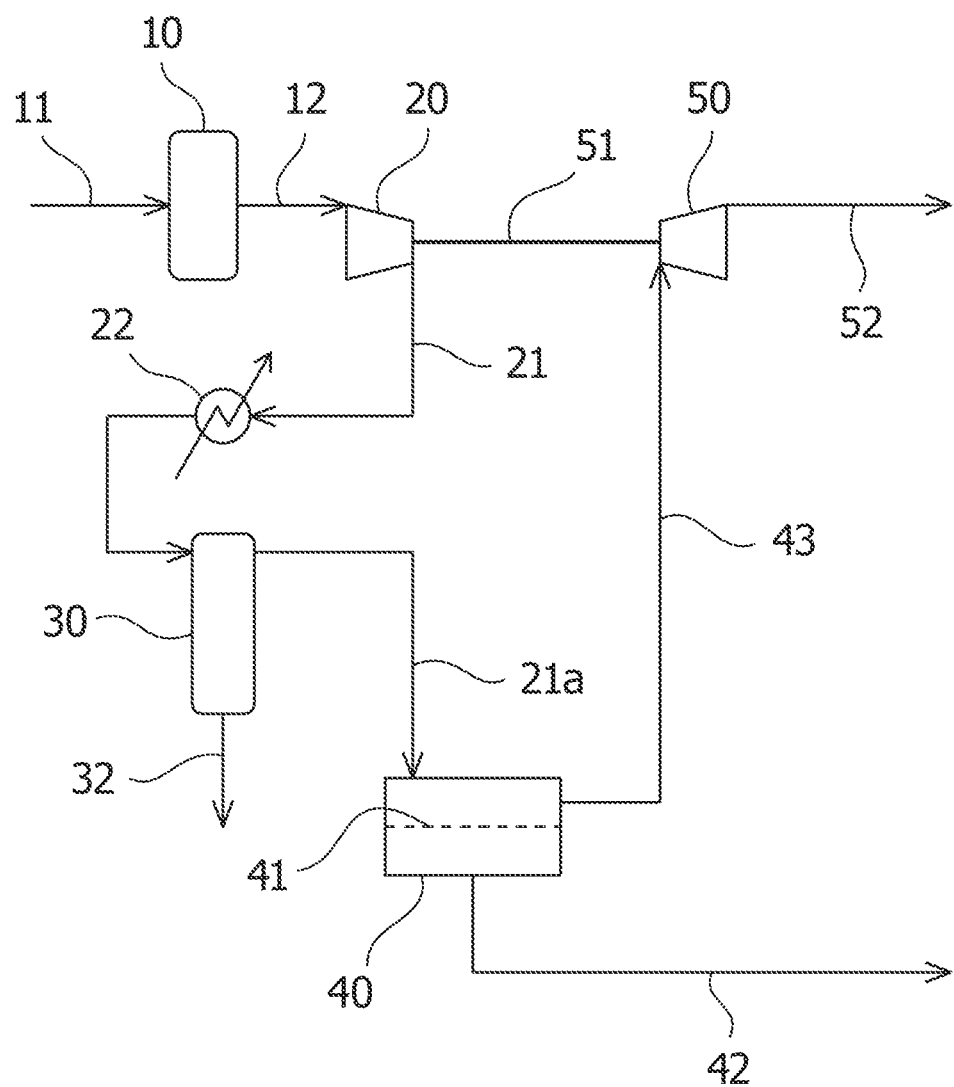
FIG. 1 is a schematic view showing an embodiment of a system for separating $CO_2$ from natural gas according to the present invention.

As shown in FIG. 1, a system for separating $CO_2$ from natural gas according to an embodiment mainly includes an $H_2S$ remover 10, a compressor 20, a $CO_2$ separator 40, and an expander 50. The $H_2S$ remover 10 removes $H_2S$ from natural gas that contains $CO_2$ and $H_2S$. The compressor 20 pressurizes the natural gas from which $H_2S$ has been removed by the $H_2S$ remover. The $CO_2$ separator 40 separates $CO_2$ from the natural gas that has been pressurized by the compressor 20. The expander 50 expands the natural gas from which $CO_2$ has been separated by the $CO_2$ separator, and thereby recovers energy from the natural gas.

The $H_2S$ remover 10 is provided with a raw gas supply line 11 for supplying raw natural gas containing $CO_2$ and $H_2S$ to the present system. The $H_2S$ remover 10 is not particularly limited, but it is preferably a device for removing $H_2S$ from gas by using a method such as an adsorption or absorption method. Raw natural gas may sometimes contain $H_2S$ on the order of a percent, although depending on production area and the like, and the $H_2S$ remover 10 preferably has an $H_2S$ removal capability sufficient to decrease such $H_2S$ concentration to 0.5 ppm or less.

The $H_2S$ remover 10 is connected to the compressor 20 by a line 12 through which the natural gas from which $H_2S$ has been removed flows. Specifically, the compressor 20 shares a drive shaft 51 with the expander 50, which will be described later. Thus, rotational energy provided by the expander 50 is partly used to drive the compressor 20. The compressor 20 preferably has a compression capability sufficient to pressurize a subject gas to a pipeline receiving pressure (4 MPaG or more, for example).

The compressor 20 is connected to the $CO_2$ separator 40 by a line 21 through which the pressurized natural gas flows. In this embodiment, a cooler 22 and a gas/liquid separator 30 are disposed on the line 21. The cooler 22 cools the natural gas, and the gas/liquid separator 30 removes, from the natural gas, the condensate produced by the cooling.

Although not particularly limited, the cooler 22 is configured to exchange heat between the natural gas that has been pressurized by the compressor 20 and a coolant, for example. Water or the like is preferably used as the coolant, although this is not particularly so limited. The gas/liquid separator 30 is not particularly limited as long as it has a configuration capable of separating, from the raw gas, the condensate including water and components (hydrocarbons with two or more carbon atoms) each having a higher boiling point than methane, which is a main component of natural gas. The gas/liquid separator 30 is provided with a line 32 for discharging the condensate out of the system, and with a line 21a for sending the $CO_2$ separator 40 the natural gas from which the condensate has been separated.

The $CO_2$ separator 40 includes a separation membrane 41 with excellent $CO_2/CH_4$ selectivity. As the separation membrane 41, an inorganic membrane having a regular pattern of pores, such as a zeolite membrane or a carbon membrane, is preferable, for example.

The $CO_2$ separator 40 is provided with a line 42 through which $CO_2$ gas having passed through the separation membrane 41, and thus separated from natural gas, flows. In addition, the $CO_2$ separator 40 is connected to the expander 50 by a line 43 through which the natural gas having flowed through $CO_2$ separator 40 without passing through the separation membrane 41, i.e., the natural gas from which $CO_2$ has been removed, flows.

The expander 50 is not particularly limited as long as it can extract energy as rotational force by expanding high-pressure natural gas and thereby, for example, rotating the turbine blade. This rotational force is partially used to drive the compressor 20 by way of the drive shaft 51. In addition, the rotational force can also be partially used to drive a generator (not shown) to obtain electric power therefrom. The expander 50 is provided with a line 52 through which the natural gas from which $CO_2$ and $H_2S$ have been removed and which has been depressurized flows as product gas.

In such a configuration, the raw natural gas containing $CO_2$ and $H_2S$ is supplied to the $H_2S$ remover 10 through the line 11. The $H_2S$ remover 10 removes $H_2S$ so as to decrease the $H_2S$ concentration of the natural gas preferably to 0.5 ppm or less. The natural gas from which $H_2S$ has been removed is supplied to the compressor 20 through the line 12.

The compressor 20 pressurizes natural gas to a level preferably in a range of approximately 4 to 20 MPaG, more preferably in a range of approximately 4 to 10 MPaG. The pressurized natural gas is supplied eventually to the $CO_2$ separator 40 through the line 21. However, before the pressurized natural gas is supplied to the $CO_2$ separator 40, the pressurized natural gas is cooled by the cooler 22 so as to condense water and high-boiling components (hydrocarbons with two or more carbon atoms) contained in the natural gas, and the resultant condensate is separated from the natural gas by the gas/liquid separator 30. The cooler 22 cools the natural gas to a cooling temperature that ensures that water and high-boiling components in the gas are condensed, although the cooling temperature varies depending on the pressure and composition of the natural gas.

The $CO_2$ separator 40 separates the supplied natural gas into $CO_2$ gas, to which the separation membrane 41 is permeable, and the other natural gas components including methane as a main component, to which the separation membrane 41 is not permeable. In this case, the pressurized natural gas is supplied to the $CO_2$ separator 40. This increases a $CO_2$ partial pressure difference across the separation membrane 41, thus improving the gas permeation rate per unit area of the separation membrane. In other words, this makes it possible to reduce the area of the separation membrane required for a predetermined gas permeation rate, thus reducing the equipment cost for the separation membrane, which is likely to be expensive.

In addition, the natural gas from which $H_2S$ has been removed is supplied to the $CO_2$ separator 40. Accordingly, the separation membrane 41 is prevented from being deteriorated by condensed $H_2S$ staying on the separation membrane 41. Moreover, the natural gas from which water and high-boiling components (hydrocarbons with two or more carbon atoms) has been removed is supplied to the $CO_2$ separator 40. Thus, the separation membrane 41 is prevented from being clogged by water and high-boiling components condensed on the separation membrane 41.

The natural gas from which $CO_2$ has been removed by the $CO_2$ separator 40 is supplied to the expander 50 through the line 43. The expander 50 expands the supplied natural gas to a receiving pressure specified for product gas, and thereby extracts energy as rotational force. This rotational force is partially used to drive the compressor 20 by way of the drive shaft 51, thereby reducing the operating cost of the compressor 20. This reduction in the operating cost of the compressor 20 contributes to a significant reduction in the overall operating cost as compared to a conventional $CO_2$ absorption method and membrane separation method. The natural gas thus depressurized is provided as product gas through the line 52.

Figure 2:
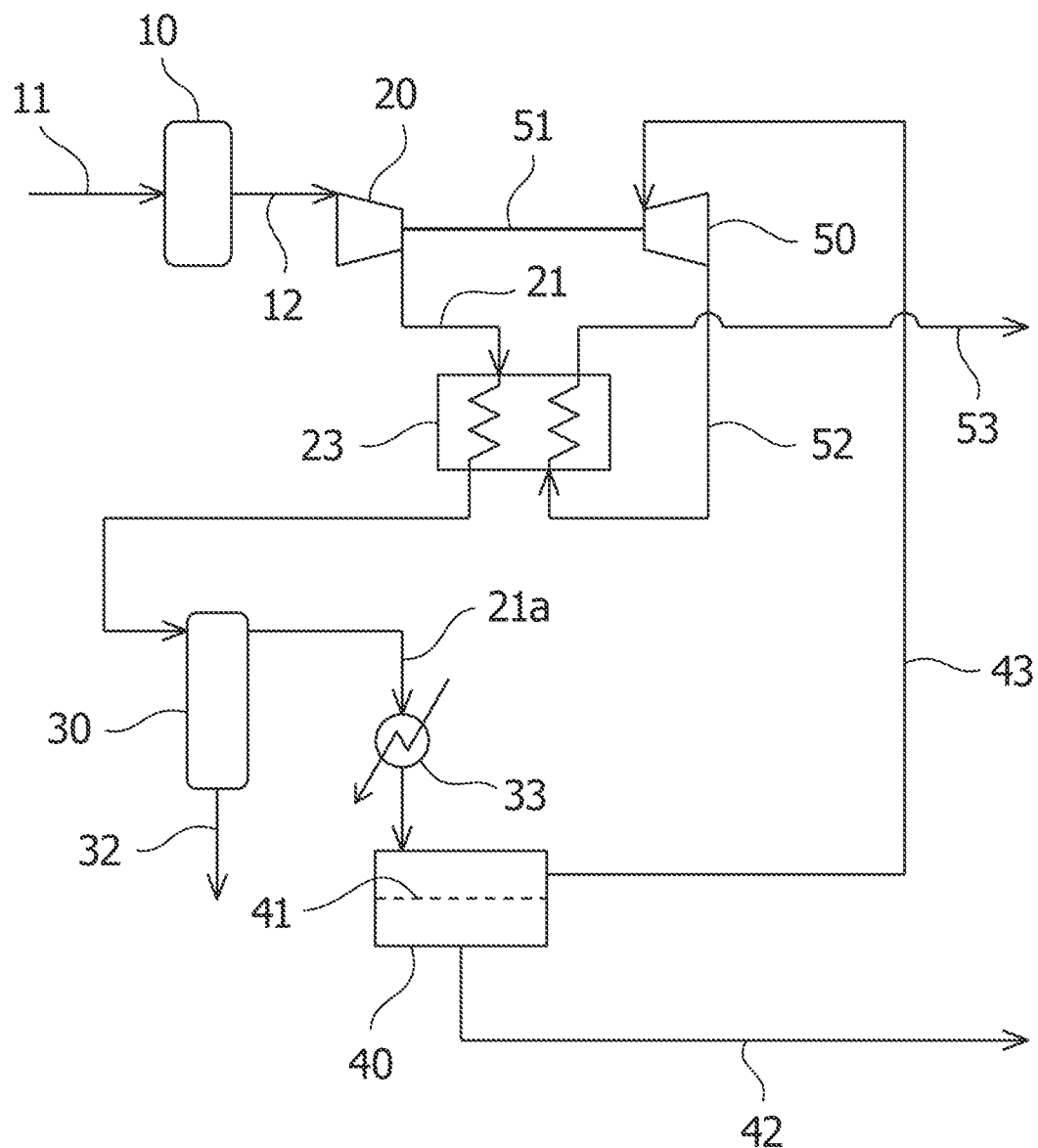
FIG. 2 is a schematic view showing a different embodiment of a system for separating $CO_2$ from natural gas according to the present invention.

Next, an embodiment as shown in FIG. 2 will be described. The same reference numerals are given to the same components as those in the embodiment shown in FIG. 1, and the description of their configuration and operations will be omitted.

In this embodiment, the cooler 22 shown in FIG. 1 is replaced by a heat exchanger 23. The heat exchanger 23 is configured to exchange heat between the natural gas that has been pressurized by the compressor 20 and the natural gas that has been depressurized by the expander 50. On the line 21a connecting the gas/liquid separator 30 and the $CO_2$ separator 40, a heater 33 for heating natural gas is disposed.

In the configuration as described above, the heat exchanger 23 is supplied with the natural gas that has been pressurized by the compressor 20 and with the natural gas that has been depressurized by the expander 50. Accordingly, similarly to the cooler 22 of FIG. 1, the heat exchanger 23 can cool the natural gas flowing through the line 21 by use of the cold energy of the depressurized natural gas flowing through the line 52, and thereby condense water and high-boiling components (hydrocarbons with two or more carbon atoms) contained in the natural gas. Such configuration ensures reduction in cooling power requirement for condensing water and high-boiling components contained in the natural gas, thus contributing to a further reduction in the overall operating cost. After the cold energy is used by the heat exchanger 23, the natural gas is provided as product gas through the line 53.

In this embodiment, after the gas/liquid separator 30 has removed the condensate including water and high-boiling components from the natural gas, the heater 33 heats the natural gas. In this event, it is preferable to heat the natural gas to a temperature in a range of approximately 20 to 200° C., more preferable to a temperature in a range of approximately 30 to 100° C. Heating the natural gas before it enters the $CO_2$ separator 40 as described above not only allows the $CO_2$ separator 40 to fully provide its separation capability, but also prevents droplet solidification due to depressurization by the expander 50 in the natural gas in the expander 50 and the heat exchanger 23, thus preventing the expander 50 and the heat exchanger 23 from being damaged by such solidified droplets.

Figure 3:
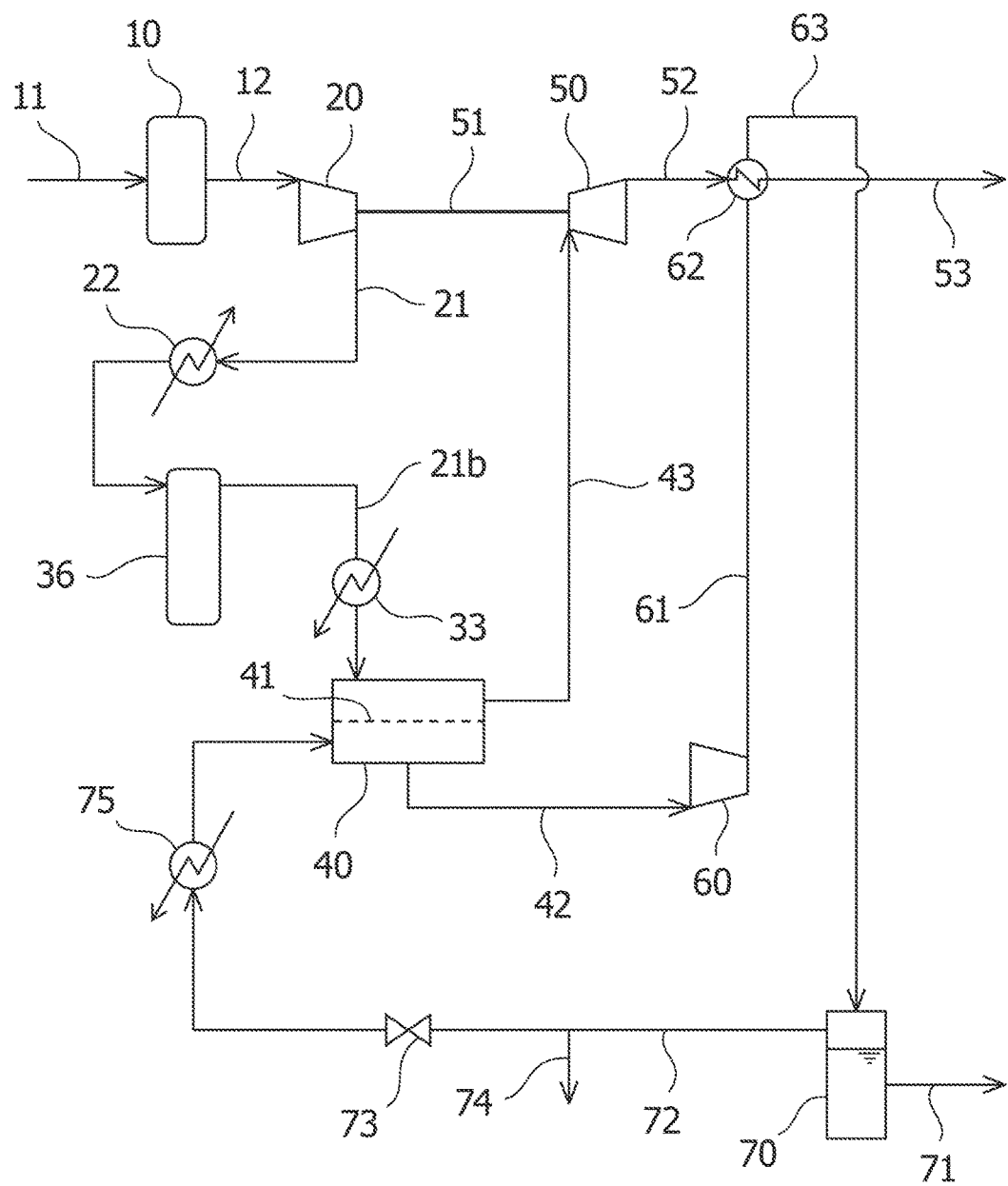
FIG. 3 is a schematic view showing another embodiment of a system for separating $CO_2$ from natural gas according to the present invention.

Next, an embodiment as shown in FIG. 3 will be described. The same reference numerals are given to the same components as those in the embodiment shown in FIG. 1, and the description of their configuration and operations will be omitted.

In addition to the components shown in FIG. 1, the system according to this embodiment further includes a $CO_2$ compressor 60, a $CO_2$ cooler 62, and a $CO_2$ gas/liquid separator 70. The $CO_2$ compressor 60 pressurizes the $CO_2$ gas that has been separated by the $CO_2$ separator 40. The $CO_2$ cooler 62 cools and liquefies this pressurized $CO_2$ gas. The $CO_2$ gas/liquid separator 70 separates off-gas from this liquefied $CO_2$.

In addition, the gas/liquid separator 30 shown in FIG. 1 is replaced by an adsorber 36 for adsorbing water from natural gas. The adsorber 36 is filled with an adsorbent capable of absorbing and removing water from natural gas, such as molecular sieves or silica gel. When the concentration of the high-boiling components in raw natural gas is not very high, the partial pressures of the high-boiling components are not expected to rise above their vapor pressures even after the separation membrane 41 of the $CO_2$ separator 40 has removed $CO_2$ from the natural gas. Thus, in such a case, disposing the adsorber 36 as described above is sufficient to prevent components from being condensed and liquefied on the separation membrane 41.

The $CO_2$ compressor 60 is connected to the $CO_2$ cooler 62 by a line 61 through which the $CO_2$ gas pressurized by the $CO_2$ compressor 60 flows. The $CO_2$ compressor 60 preferably has a compression capability sufficient to pressurize the $CO_2$ gas to a level that ensures that the pressurized $CO_2$ can be liquefied by cooling. In addition, in order to provide cold energy source for exchanging heat with the pressurized $CO_2$ gas, the $CO_2$ cooler 62 is also connected to the line 52 through which the natural gas that has been depressurized by the expander 50 flows.

The $CO_2$ gas/liquid separator 70 is provided with lines 63, 71, 72. The line 63 is for supplying $CO_2$ that has been cooled by the $CO_2$ cooler 62. The line 71 is for discharging the liquefied $CO_2$ that has been separated by the $CO_2$ gas/liquid separator 70. The line 72 is for discharging the off-gas that has been separated by the $CO_2$ gas/liquid separator 70. The line 72 is connected to the $CO_2$ separator 40 so that the off-gas can be reused as a sweep gas for the $CO_2$ separator 40. In addition, the line 72 may be provided with a valve 73 and may be connected to a line 74 for providing the off-gas to the outside of the system in order to reuse the off-gas as fuel or the like. Furthermore, the line 72 is also provided with a heater 75 for heating the off-gas so as to reuse the off-gas as a sweep gas.

In the configuration as described above, the $CO_2$ gas that has been separated by the $CO_2$ separator 40 is supplied to the $CO_2$ compressor 60 through the line 42, and it is pressurized by the $CO_2$ compressor 60 to a level that ensures that the pressurized $CO_2$ can be liquefied by cooling. The pressurized $CO_2$ gas is then supplied to the $CO_2$ cooler 62 through the line 61. In the $CO_2$ cooler 62, the pressurized $CO_2$ gas is cooled to its critical temperature or below and is liquefied, by use of the cold energy of the natural gas that has been depressurized by the expander 50. The liquefied $CO_2$ is supplied through the line 63 to the $CO_2$ gas/liquid separator 70, which separates the off-gas such as methane from the liquefied $CO_2$. For example, the liquefied $CO_2$ from which off-gas has been separated may be pressurized by a pump so as to be stored in the ground such as oil fields (CCS) or used in an enhanced oil recovery (EOR) method.

The off-gas may be used as fuel for a boiler or the like. The off-gas may also be supplied to the $CO_2$ separator 40, and used as a sweep gas therefor. Using, as a sweep gas, the off-gas including methane as a main component contributes to improving the gas permeation rate per unit area of the separation membrane. Thus, this makes it possible to reduce the area of the separation membrane 41 provided to the $CO_2$ separator 40, thus reducing the installation cost for the separation membrane.

Figure 4:
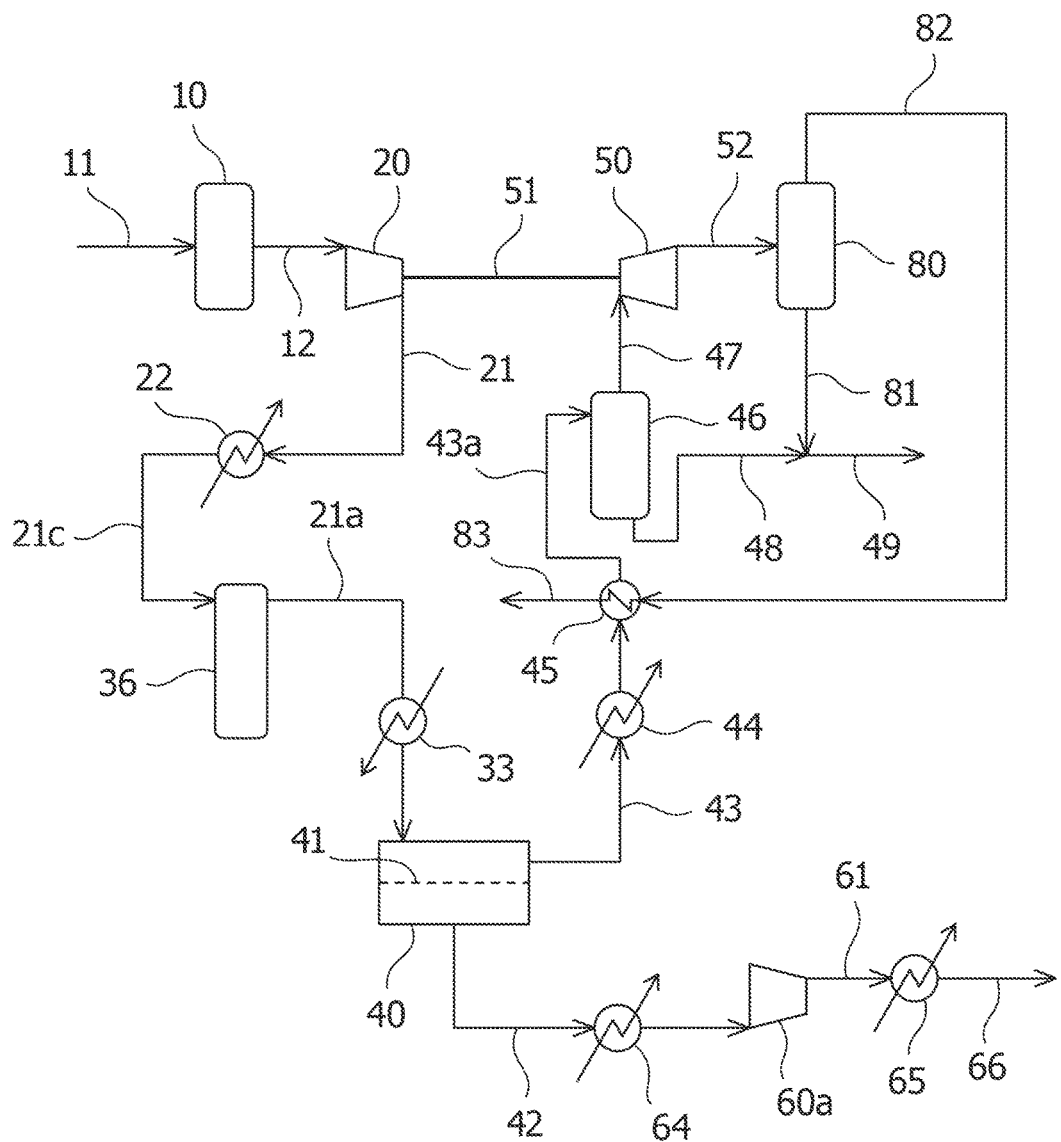
FIG. 4 is a schematic view showing still another embodiment of a system for separating $CO_2$ from natural gas according to the present invention.

Next, an embodiment as shown in FIG. 4 will be described. The same reference numerals are given to the same components as those in the embodiment shown in FIG. 1, and the description of their configuration and operations will be omitted.

In addition to the components shown in FIG. 1, the system according to this embodiment further includes a $CO_2$ compressor 60a, a high-boiling component cooler 44, a high-boiling component heat exchanger 45, a first high-boiling component gas/liquid separator 46, and a second high-boiling component gas/liquid separator 80. The $CO_2$ compressor 60a pressurizes the $CO_2$ gas that has been separated by the $CO_2$ separator 40. The high-boiling component cooler and heat exchanger 44, 45 cool the natural gas from which $CO_2$ has been separated by the $CO_2$ separator 40, thereby liquefying high-boiling components (hydrocarbons with two or more carbon atoms) remaining in the natural gas. The first high-boiling component gas/liquid separator 46 separates the liquefied components from the natural gas that has been cooled by the high-boiling component cooler and heat exchanger 44, 45. The second high-boiling component gas/liquid separator 80 separates the liquefied components from the natural gas that has been depressurized by the expander 50.

The $CO_2$ compressor 60a in this embodiment is for pressurizing the $CO_2$ gas that has been separated by the $CO_2$ separator 40 and supplying, as product gas, the $CO_2$ gas to a $CO_2$ pipeline or the like. To this end, a first $CO_2$ cooler 64 and a second $CO_2$ cooler 65 for cooling $CO_2$ gas are disposed upstream and downstream to the $CO_2$ compressor 60a. The $CO_2$ compressor 60a and the first and second $CO_2$ coolers 64, 65 have capabilities that ensure that the supplied $CO_2$ gas is pressurized to a $CO_2$ pipeline receiving pressure or more.

The high-boiling component cooler and heat exchanger 44, 45 preferably have cooling capabilities sufficient to reduce the temperature of the natural gas from which $CO_2$ has been separated by the $CO_2$ separator 40 to a temperature at which high-boiling components remaining therein are liquefied. The first high-boiling component gas/liquid separator 46 is provided with lines 47, 48. The line 48 is for providing the liquefied high-boiling components as products. The line 47 is for supplying the natural gas from which these liquefied components have been removed to the expander 50. The second high-boiling component gas/liquid separator 80 is connected to lines 81, 82. The line 81 is for providing the liquefied high-boiling components as products. The line 82 is for supplying, as cold energy source to the high-boiling component heat exchanger 45, the natural gas from which these liquefied components have been removed.

In the configuration as described above, the $CO_2$ gas separated by the $CO_2$ separator 40 is supplied to the $CO_2$ compressor 60a and the first and second $CO_2$ coolers 64, 65 through the line 42, and pressurized and cooled therein to $CO_2$ pipeline receiving pressure and temperature. Then, the $CO_2$ gas thus pressurized and cooled is provided as a product through a line 66.

The natural gas from which $CO_2$ has been separated by the $CO_2$ separator 40 is supplied sequentially to the high-boiling component cooler and heat exchanger 44, 45 through the line 43. Thereby, the natural gas is cooled so that the high-boiling components remaining in the natural gas are liquefied. Then, the first high-boiling component gas/liquid separator 46 separates, from the natural gas, the liquefied high-boiling components, which are then provided through the line 48.

The natural gas from which these liquefied components have been removed is supplied to the expander 50 through the line 47. The expander 50 depressurizes the natural gas to the pipeline receiving pressure. In this event, the high-boiling components remaining in the gas are liquefied. Thus, the second high-boiling component gas/liquid separator 80 separates, from the natural gas, the liquefied high-boiling components, which are then provided as products through the line 81. The natural gas from which these liquefied components have been removed is supplied as cold energy source to the high-boiling component heat exchanger 45 through the line 82. After it is used as cold energy source, the natural gas is provided as product gas through a line 83.

In this embodiment, the natural gas is cooled and expanded to extract expensive high-boiling components from the natural gas having passed through the $CO_2$ separator 40. As a result, a liquid of high-boiling components containing no $CO_2$ can be extracted.

REFERENCE SYMBOLS LIST

10 $H_2S$ remover
20, 60 compressor
22, 44, 64, 65 cooler
23, 45, 62 heat exchanger
30, 46, 70, 80 gas/liquid separator
33, 75 heater
36 adsorber
40 $CO_2$ separator
41 separation membrane
50 expander
51 drive shaft

The invention claimed is:

1. A system for separating carbon dioxide from natural gas containing carbon dioxide and hydrogen sulfide, comprising:
a hydrogen sulfide remover for removing hydrogen sulfide from the natural gas;
a compressor for pressurizing the natural gas from which hydrogen sulfide has been removed by the hydrogen sulfide remover;
a cooler for cooling the natural gas that has been pressurized by the compressor so as to condense a component that is a part of the natural gas;
a gas/liquid separator for removing the condensed component from the natural gas that has been cooled by the cooler;
a carbon dioxide separator including a separation membrane for separating carbon dioxide from the natural gas from which the condensed component has been removed by the gas/liquid separator; and
an expander for expanding the natural gas from which carbon dioxide has been separated by the carbon dioxide separator and recovering energy from the natural gas.

2. The system according to claim 1, wherein the cooler is a heat exchanger for exchanging heat between the natural gas that has been pressurized by the compressor and the natural gas that has been expanded by the expander.

3. The system according to claim 1, further comprising:
a second compressor for pressurizing carbon dioxide-containing gas that has been separated by the carbon dioxide separator;
a second heat exchanger for cooling and liquefying the carbon dioxide-containing gas that has been pressurized by the second compressor;
a second gas/liquid separator for separating off-gas from the liquefied gas; and
a line for supplying the natural gas that has been expanded by the expander as cold energy source to the second heat exchanger.

4. The system according to claim 1, further comprising:
a third heat exchanger for cooling the natural gas from which carbon dioxide has been separated by the carbon dioxide separator so as to liquefy a component that is a part of the natural gas;
a third gas/liquid separator for separating the liquefied component from the natural gas that has been cooled by the third cooler;
a line for supplying the natural gas from which the liquefied component has been separated by the third gas/liquid separator to the expander; and
a line for supplying the natural gas that has been expanded by the expander as cold energy source to the third heat exchanger.

* * * * *